United States Patent
Smith

[11] 3,920,432
[45] Nov. 18, 1975

[54] METHOD OF FABRICATING AN OPTICAL FIBER RIBBON

[75] Inventor: Peter William Smith, Colts Neck, N.J.

[73] Assignee: Bell Telephone Laboratories, Incorporated, Murray Hill, N.J.

[22] Filed: Aug. 30, 1974

[21] Appl. No.: 502,178

[52] U.S. Cl. .............................. 65/4; 65/37; 65/38; 65/DIG. 7; 350/96 WG; 350/96 C
[51] Int. Cl.² .................. C03C 23/20; C03B 11/08; G02B 5/14
[58] Field of Search ............... 65/4, DIG. 7, 37, 38; 350/96 WG, 96 C

[56] References Cited
UNITED STATES PATENTS

| | | | |
|---|---|---|---|
| 3,010,357 | 11/1961 | Hirschowitz | 65/4 X |
| 3,323,886 | 6/1967 | Hays | 65/4 |
| 3,347,649 | 10/1967 | Singer, Jr. | 65/4 |
| 3,411,010 | 11/1968 | Genahr et al. | 350/227 |
| 3,505,046 | 4/1970 | Phaneuf | 65/4 X |
| 3,556,635 | 1/1971 | Schrenk et al. | 350/96 |
| 3,615,313 | 10/1971 | Phaneuf | 65/4 |
| 3,684,468 | 8/1972 | Bode et al. | 65/38 X |
| 3,743,560 | 7/1973 | Western | 65/DIG. 7 |
| 3,797,910 | 3/1974 | Westwig | 65/DIG. 7 |
| 3,819,442 | 6/1974 | Brushenko | 65/4 X |
| 3,844,752 | 10/1974 | Kaiser | 65/4 |
| 3,847,585 | 11/1974 | Chisholm | 65/DIG. 7 |
| 3,879,182 | 4/1975 | Strack | 65/39 X |
| T900,002 | 7/1972 | Weilar | 350/66 |

OTHER PUBLICATIONS

The Properties of Glass by Morey Reinhold Pub. Corp., N.Y., (1954), pp. 146 and 272.

Primary Examiner—S. Leon Bashore
Assistant Examiner—Frank W. Miga
Attorney, Agent, or Firm—Thomas C. O'Konski

[57] ABSTRACT

A precision optical fiber ribbon is simply and inexpensively fabricated according to the disclosed invention by continuously feeding a plurality of glass fiber waveguides through a grooved holder which accurately aligns them, while a plurality of glass spacing fibers of a triangular cross section are continuously fed into the spaces between adjacent fiber waveguides in the holder. The triangular spacing fibers are formed of a glass having a softening temperature lower than that of the fiber waveguides. By means of a heating wire, the triangular fibers are heated and fused to the fiber waveguides, and then allowed to cool as the completed ribbon is pulled out of the holder. The fusing temperature is selected so that deformation occurs only in the triangular fibers. The resulting all-glass ribbon has the advantage that it can be scored and subjected to a properly tailored stress to break the entire ribbon in one motion forming a smooth end surface perpendicular to the fiber axes suitable for splicing.

3 Claims, 6 Drawing Figures

METHOD OF FABRICATING AN OPTICAL FIBER RIBBON

BACKGROUND OF THE INVENTION

This invention relates to optical fiber transmission media and, more particularly, the precision optical fiber ribbons, their fabrication and their splicing.

Optical fiber waveguide ribbons have recently become of interest for the construction of multi-channel transmission cable of the type to be used in future optical communication systems. In a typical fiber ribbon, a plurality of fiber waveguides are embedded in spaced-apart positions parallel to each other in a common outer jacket or sheathing. The most promising feature of the fiber ribbon is that it has the potential of greatly simplifying the construction, installation and maintenance of fiber cable by eliminating the need to handle individual fibers. For example, splicing and connecting of the individual fibers in a ribbon could be simply accomplished by splicing and connecting the much larger ribbon, if the fiber positions in the ribbon could be precisely fixed and maintained. Accurate alignment of the individual fibers during fabrication of the ribbon has presented a persistent problem to the worker in the art. Additionally, finding a ribbon structure which maintains accurate alignment of the individual fibers during handling and use of the ribbon has been difficult.

A related problem that has been encountered in connecting and splicing fiber ribbons is the ribbon end preparation. In order to obtain a low-loss connection, the abutting end surfaces of the individual fibers to be connected must be optically smooth and perpendicular to the fiber axes. Moreover, the ends of the individual fibers in the ribbon must be in one cross sectional plane, if the individual fibers are to be spliced by splicing the ribbon as a whole. Conventional grinding and polishing techniques would be much too time consuming and too costly and, in general, impractical, especially when practiced in the field by service and maintenance personnel. Any end preparation technique which requires the worker to handle individual fibers in the ribbon in order to make a splice would likewise be time consuming and impractical.

It is, accordingly, the broad object of the present invention to provide a simple method for fabricating an optical fiber ribbon in which the individual fiber positions are precisely fixed and maintained, and which can be broken in one motion to produce a smooth, perpendicular end surface suitable for splicing.

SUMMARY OF THE INVENTION

In accordance with the present invention, a precision optical fiber ribbon is fabricated by placing a plurality of fiber waveguides in a grooved holder which accurately aligns them in spaced-apart positions relative to each other, and by disposing a plurality of spacing fibers in the spaces between, and in a contacting relationship with, the adjacent fiber waveguides in the holder. The spacing fibers are selected to have a cross-sectional shape, such as a triangular shape, which is effective in preventing movement of the fiber waveguides either vertically or laterally while in the holder. Additionally, the spacing fibers are formed of a suitable material such as a glass composition having a softening temperature that is lower in value than that of the fiber waveguides. While the fibers are thus situated in the holder, they are heated to a temperature above the softening temperature of the spacing fibers but below the softening temperature of the fiber waveguides, thereby fusing the spacing fibers to the fiber waveguides. Since the fusing temperature is lower than the softening temperature of the fiber waveguides, deformation occurs only in the spacing fibers and the fiber waveguides are substantially undistorted. The fibers are then allowed to cool while still in the holder to fix the fiber waveguides in their previously aligned positions. Upon removal from the holder, a fiber ribbon results in which the individual fiber waveguides are rigidly held in precise relative positions.

Advantageously, in accordance with an illustrative embodiment of the invention, the alignment holder is designed so that the fiber waveguides and the spacing fibers are continuously fed therethrough, and the completed ribbon is continuously pulled out of the holder. Relatively large lengths of precision optical fiber ribbon can be simply and inexpensively fabricated in this manner.

Additionally, an all glass fiber ribbon fabricated in accordance with the method of the invention has the advantage that it can be scored and subjected to a properly tailored stress to break the entire ribbon in one motion forming an optically smooth end surface thereon perpendicular to the fiber axes suitable for splicing. The fiber waveguides of pairs of fiber ribbons thus prepared can be connected together by placing the exposed ends of the ribbons in contact with each other. If a permanent splice is to be made, the two ribbon ends can be placed within a positioning jig and bonded together. It will be noted that at no stage during the splicing process does one have to handle or align individual fiber waveguides.

BRIEF DESCRIPTION OF THE DRAWING

These and other features and advantages of the invention can be better understood from the following detailed description taken in conjunction with the accompanying drawing in which.

DETAILED DESCRIPTION

Figure 1A:
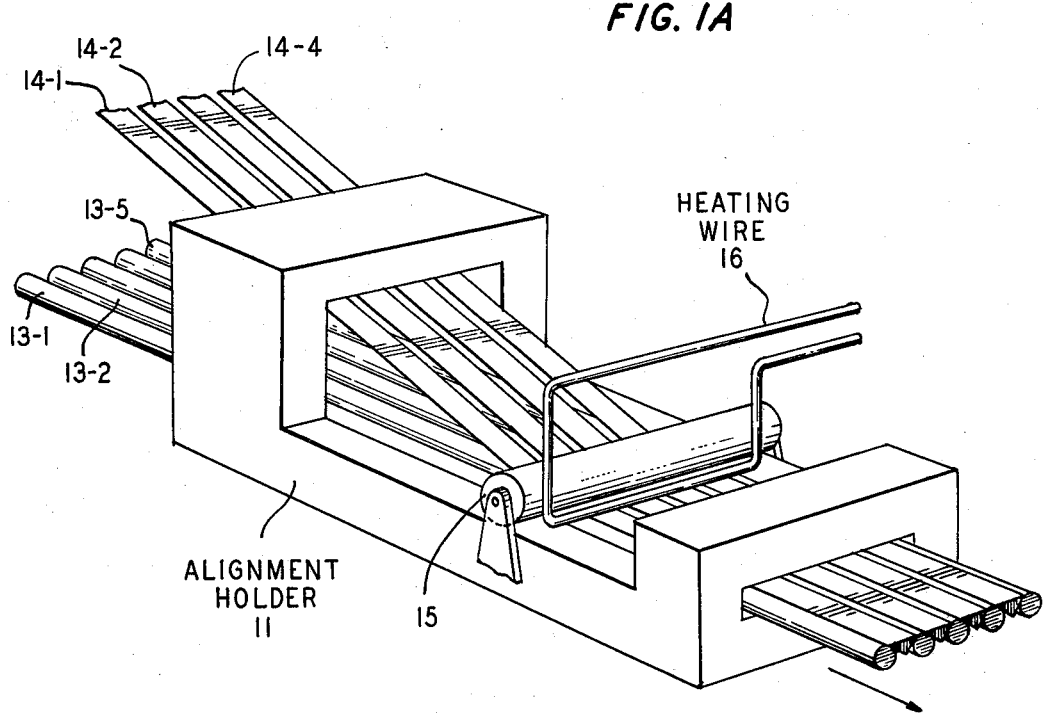
FIG. 1A is a perspective view.
Figure 1B:
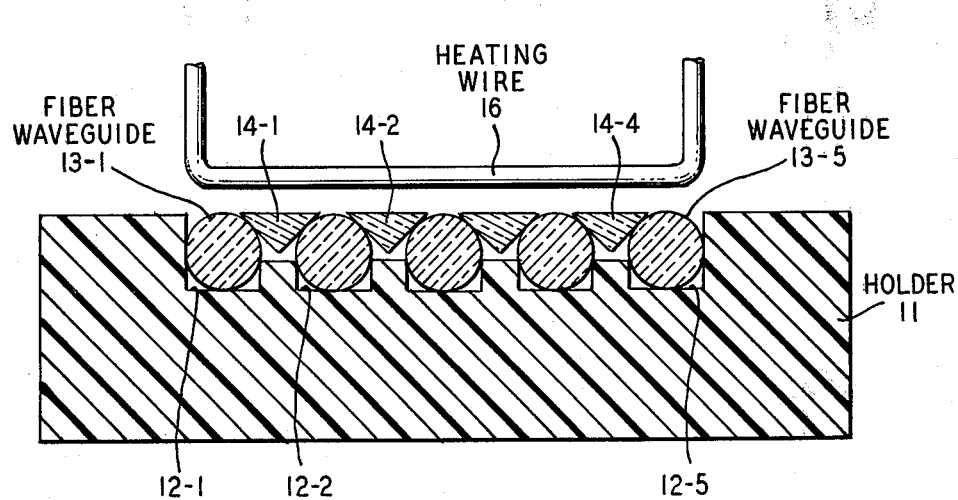
FIG. 1B is a cross-sectional view, of the alignment holder and related apparatus used in the fabrication of the precision optical fiber ribbon of the invention.

FIGS. 1A and 1B show illustrative apparatus for fabricating the precision optical fiber ribbon of the invention. Holder 11 serves to align accurately the various optical fiber waveguides to be included in the ribbon in spaced apart positions relative to each other. As is shown more clearly in FIG. 1B, holder 11 illustratively includes a series of longitudinal grooves 12-1, 12-2 . . . 12-5, the dimensions of which are selected to provide the desired spacing between the fiber waveguides. A plurality of optical fiber waveguides 13-1, 13-2 . . . 13-5 are fed into holder 11 so that they rest in grooves 12-1, 12-2 ... 12-5, respectively. Preferably, holder 11 is formed of a material which allows fiber waveguides 13 to be continuously pulled therethrough with a small pulling force, while maintaining contact with grooves 12, and without causing any surface damage to the fiber waveguides. Boron nitride is a suitable material for holder 11 for this purpose. Typically, fiber waveguides 13 can be fed directly into holder 11 from a source such as one or more drums upon which they are stored. For purposes of illustration, five grooves in holder 11 and five fiber waveguides are shown. Obviously, more or fewer grooves and fibers can be included.

A plurality of spacing fibers 14-1, 14-2 ... 14-4 illustratively of a triangular cross section, are next fed into the spaces formed between adjacent fiber waveguides 13 in holder 11. The cross-sectional shape and size spacing fibers 14 is such that they contact each fiber waveguide of each adjacent pair in the holder, as shown in FIG. 1B. Although triangular cross-section spacing fibers are illustrated thoughout the drawing, any cross-sectional shape is acceptable for spacing fibers 14 provided that shape is effective in preventing movement of fiber waveguides 13 both vertically and laterally while in holder 11. Obviously, fibers with circular or semi-circular cross sections could also be used for spacing fibers 14. To help maintain the contact between spacing fibers 14 and fiber waveguides 13, roller 15 is illustratively attached to holder 11 to exert a slight downward pressure against spacing fibers 14. Roller 15 is otherwise free to turn as the assembly of spacing fibers and fiber waveguides is pulled through holder 11.

The material of spacing fibers 14 is selected to have a softening temperature $T_s$ which is less in value than the softening temperature $T_f$ of fiber waveguides 13. Thus, upon heating, spacing fibers 14 soften and deform prior to fiber waveguides 13. Heating means, such as heating wire 16, is included to heat the fiber assembly as it is pulled through holder 11 to a temperature above the softening temperature $T_s$ of fibers 14 but below the softening temperature $T_f$ of fiber waveguides 13. Heating wire 16 is illustratively situated adjacent to roller 15 on the output side of holder 11, as shown in FIG. 1A, and may be lowered so that it actually contacts fibers 14. Spacing fibers 14 are thereby fused to fiber waveguides 13 at the regions of contact therebetween. The fusing temperature is such that fiber waveguides 13 remain substantially undistorted during the fusing process.

The fiber assembly is next allowed to cool, and spacing fibers 14 allowed to harden, prior to being pulled completely from holder 11. Fiber waveguides 13 are thereby rigidly fixed in their previously defined relative positions. Large lengths of precision optical fiber ribbon can be simply and inexpensively fabricated in this manner.

Figure 2A:
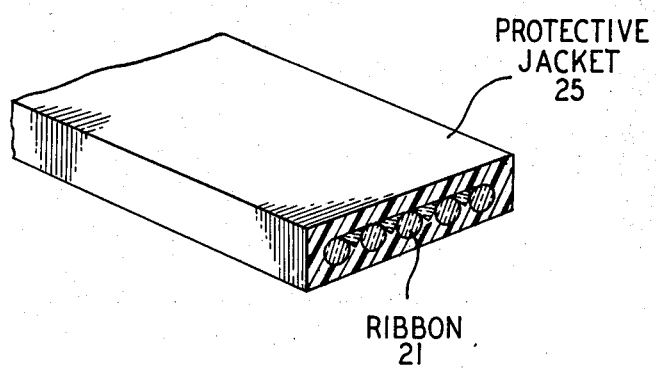
FIG. 2A is a perspective view.
Figure 2B:
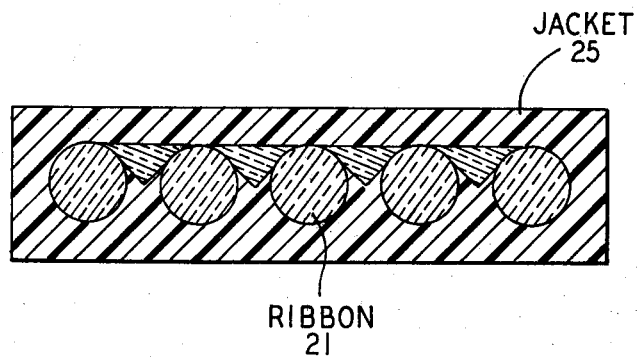
FIG. 2B is a cross-sectional view, of a precision optical fiber ribbon fabricated according to the invention which has been coated with a protective outer jacket.

FIGS. 2A and 2B show a section of the resulting optical fiber ribbon fabricated according to the illustrative method described hereinabove. Ribbon 21 of FIGS. 2A and 2B is illustratively shown to be coated with a protective outer jacket which serves to protect the ribbon during handling and use. Conventional fiber coating techniques can be used to coat the ribbon with the protective jacket 25. Jacket 25 may be made of a plastic material such as nylon or polyvinylchloride. As discussed in more detail hereinbelow, jacket 25 would be typically removed from a short distance of the fiber ribbon (e.g., by dissolving it in a suitable solvent) before scoring the ribbon to prepare an end thereof for splicing.

The respective materials of spacing fibers 14 and of fiber waveguides 13 are both preferably optically transparent glass compositions. In general, the terms "glass" and "glass composition" as used herein are intended to include both organic and inorganic rigid materials having a non-crystalline structure, and would include not only the more common inorganic oxide glasses, but also many high molecular weight polymers such as polystyrene and polymethylmethacrylate. As is well known, glass materials are widely used in the fabrication of optical fiber waveguides, because most such materials are transparent and readily drawn into minute fiber structures. The wide variety of glass compositions known and available allow one to choose respective compositions for spacing fibers 14 and waveguides 13 having respective softening temperatures that differ by sufficiently large amounts. Additionally, one glass material generally adheres rigidly and permanently to another glass material upon temperature fusing. Consequently, an all-glass fiber ribbon fabricated in accordance with the invention is effective in rigidly maintaining the individual fiber waveguides in their precisely defined relative positions. Furthermore, different glass compositions generally have comparable hardnesses at ambient temperatures. This fact is desirable if the fiber ribbon is to be prepared for splicing by scoring and breaking it in accordance with the technique discussed hereinbelow.

The structure of fiber waveguides 13 may be any of the presently known fiber waveguiding structures. In the most usual case, the fiber waveguides are individually clad and the guided optical wave energy is effectively confined within an inner core region of the fibers. Where crosstalk is not an important consideration, the fiber waveguides can be unclad. Alternatively, spacing fibers 14 can be doped or tinted with an optically absorbing material in order to prevent crosstalk in the fiber ribbon between neighboring fiber waveguides in the event that the spacing and the naturally occurring exponential decay of the guided wave intensity between the fiber waveguides is otherwise not sufficient to prevent such crosstalk. Doping spacing fibers 14 with such impurities as iron, vanadium or cobalt prior to their fabrication into the fiber ribbon would be a convenient way of accomplishing this result.

As a specific illustrative example of the glass materials useful in the fabrication of the fiber ribbon of the invention, consider the use of a glass composed of $Na_2O$, $CaO$ and $SiO_2$, a composition commonly referred to as soda-lime-silica glass. In the book by G. W. Morey entitled "The Properties of Glass," Reinhold Publishing Corp., New York, (1954), Morey defines the softening temperature of glass as that temperature at which its viscosity is equal to $10^{7.6}$ poises. From this book, it can be seen that by changing the relative compositions of the soda-lime-silica glass, it is possible to make one composition (e.g., 25.3% $Na_2O$, 0.6% $CaO$, 74.1% $SiO_2$) which has a viscosity of $10^{7.6}$ poises at 650°C and another composition (e.g., 17.2% $Na_2O$, 8.4% $CaO$, 74.4% $SiO_2$) with a viscosity two orders of magnitude greater than this at the same temperature. The thermal expansion coefficient of the first composition will be about $9.7 \times 10^{-8}$ per°C, while that of the second composition will be about $11.3 \times 10^{-8}$ per °C. Thus, one can obtain glass compositions which have viscosities differing by two orders of magnitude at 650°C, while their thermal expansion coefficients differ by only 15 percent. By using the first composition to form spacing fibers 14 and the second composition to form fiber waveguides 13, it can be assured that deformation occurs during fusing at 650°C only in the spacing fibers and that the fiber waveguides remain substantially undeformed.

Figure 3:
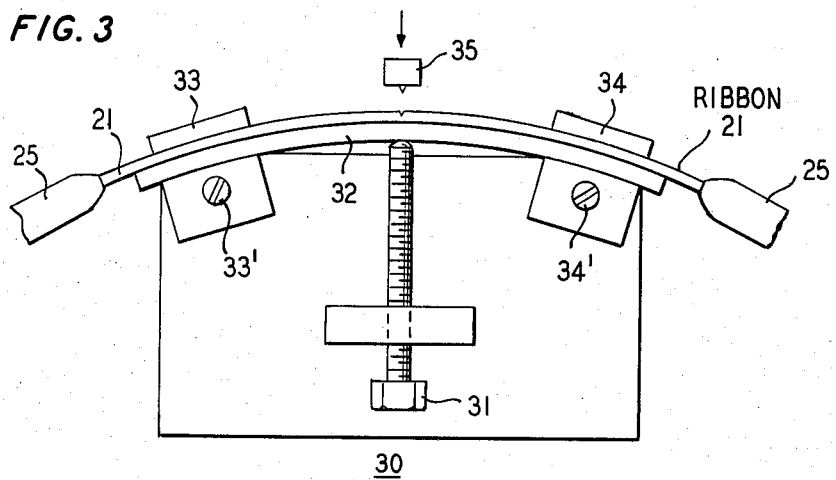
FIG. 3 is a pictorial view of illustrative apparatus useful for scoring and breaking the fiber ribbon of the invention to produce a smooth, perpendicular end surface suitable for splicing.

FIG. 3 of the drawing shows illustrative fracture apparatus 30 that can be used to prepare an end of a fiber ribbon of the invention suitable for splicing. The end preparation technique discussed here is a modification of the fracture technique disclosed earlier for individual fibers in the copending application of D. C. Gloge and myself, Ser. No. 412,293, filed Nov. 2, 1973, and assigned to the assignee hereof. Fracture apparatus 30 is compact and simple, typically a few square inches in size, and can easily be moved into a cramped and narrow space and can be operated handheld in any position simply by turning the conveniently located screw adjustment 31.

In the first step of the technique, protective outer jacket 25 is removed over a short distance so that fiber ribbon 21 is exposed in the area where the end is to be prepared. As noted earlier, jacket 25 can be removed by using a suitable solvent such as acetone, or alternatively, by mechanical stripping, in either case taking care not to damage the surface quality of the ribbon. The portion of ribbon 21 thus exposed is placed between steel spring bar 32 of fracture apparatus 30 and the two pivoting friction plates 33 and 34 so that the exposed area is located under diamond stylus 35. Although screw adjustment 31 of apparatus 30 is shown in FIG. 3 to be in a tightened position, apparatus 30 is such that, when screw adjustment 31 is loosened, there is sufficient spacing between the upper surface of spring bar 32 and friction plates 33 and 34, so that ribbon 21 can be easily inserted into this spacing. The mechanical characteristics of spring bar 32 primarily determine the stress distribution that results in ribbon 21, and thus, by a proper choice of the spring bar thickness, the appropriate ratio of bending to tensile stress can be achieved for the individual fibers to be fractured, as taught in the above-mentioned copending application.

After the exposed portion of ribbon 21 is placed in the spacing between bar 32 and friction plates 33 and 34, screw adjustment 31 is next tightened to a point where friction plates 33 and 34 are effective in preventing movement of ribbon 21 relative to bar 32. Diamond stylus 35 is then drawn across the exposed ribbon to produce scoring grooves in each of spacing fibers 14 and fiber waveguides 13 of the ribbon. A slight downward pressure of a few grams imparted to stylus 35 is sufficient to produce scoring grooves of a few micrometers in depth in each of the fibers of the ribbon 21.

Screw adjustment 31 is next tightened completely, and spring bar 32 and ribbon 21 are bent. Simultaneously, friction plates 33 and 34 slide a small distance toward the outside of spring bar 32 as a result of pivots 33' and 34'. The sliding action exerts an additional amount of tension on ribbon 21, so that the optimum ratio of tensile to bending stress is obtained in the ribbon. The combined action causes a fracture to start at each of the scoring grooves in each of the fibers and waveguides of ribbon 21, and to propagate across the ribbon. When the fracture process is complete, a fiber ribbon end region results in which the smooth, perpendicular ends of each of the fibers and waveguides in the ribbon are in one cross-sectional plane.

For a more detailed explanation of this fracture technique and fracture apparatus, reference should be made to the above-cited copending application.

Figure 4A:
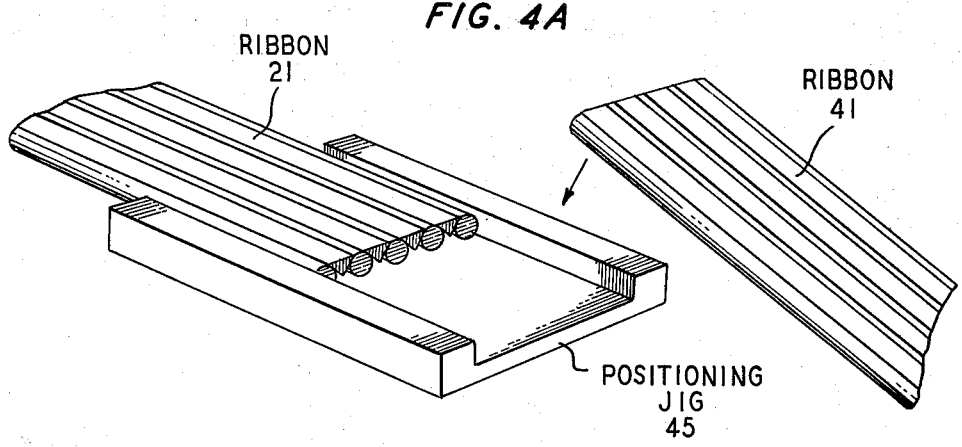
FIGS. 4A and 4B are pictorial views illustrating the use of the positioning jig for the splicing of two fiber ribbons of the invention.
Figure 4B:
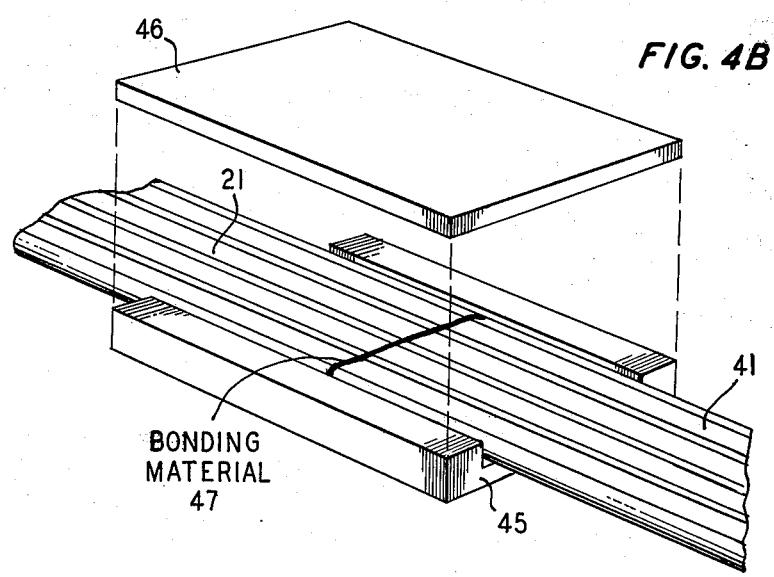

FIGS. 4A and 4B of the drawing illustrate the final phase of the ribbon splicing process, namely, the connecting of two fiber ribbons to provide an efficient fiber-to-fiber transmission across the splice. The above described series of end preparation steps is repeated for the end of another fiber ribbon fabricated according to the invention that is to be coupled to ribbon 21. The result is to obtain a second, correspondingly terminated fiber ribbon 41 as shown in FIGS. 4A and 4B. If the two ribbons 21 and 41 were made in the same alignment holder, or in a substantially identical alignment holder, and if the fiber waveguides and the spacing fibers are substantially identical in both, the overall exterior dimensions of the two ribbons are substantially identical, and all of the fiber waveguides are accurately aligned relative to each other. Ribbons 21 and 41 can thus be coupled together simply by placing them in positioning jig 45, as shown in FIG. 4A. It is noted that ribbons 21 and 41 can be placed by hand in jig 45 without the need of any precise visual alignment. Cover plate 46 shown in FIG. 4B may be used to hold the two ribbons in position. A transparent index-matching epoxy or other suitable bonding material 47 may be used to cement the two ribbons together if a permanent connection is to be made. After the bonding material has set, the fiber ribbons may be removed from jig 45 to complete the splicing process. Alternatively, positioning jig 45 and cover plate 46 can be left on the ribbons to remain as an integral part of the splice.

Numerous and varied other arrangements of the invention described illustratively hereinabove may be devised by those skilled in the art without departing the scope of the invention, as defined by the appended claims.

What is claimed is:

1. A method of fabricating an optical fiber ribbon of the type in which a plurality of fiber waveguides are rigidly fixed in precise positions relative to each other, comprising the steps of:

feeding said fiber waveguides through a holder which includes a plurality of spaced longitudinal grooves dimensioned for receiving said fiber waveguides and aligning them in predefined positions relative to each other, said fiber waveguides being formed of a first, optically transparent glass composition;

feeding between each adjacent pair of said fiber waveguides in said holder a spacing fiber having a cross-sectional size and shape sufficient to contact both of said fiber waveguides in said adjacent pair and to prevent movement of said fiber waveguides in said adjacent pair both vertically and laterally in said holder, said fiber waveguides and said spacing fibers being continuously moved relative to said holder while said fiber waveguides remain in contact with said grooves, said spacing fibers being formed of a second glass composition having a softening temperature $T_s$ which is less in value than the softening temperature $T_f$ of said fiber waveguides;

heating said spacing fibers as they are moved through said holder to a temperature above $T_s$ but below $T_f$ thereby to fuse said spacing fibers to said fiber waveguides at the regions of contact therebetween;

allowing said spacing fibers to cool sufficiently while in said holder to fix said fiber waveguides in the predefined positions; and removing the assembly of said spacing fibers and said fiber waveguides thus fixed from said holder.

2. The method of claim 1 in which said spacing fibers have a triangular cross section.

3. The method of claim 2 further including the step operative prior to said heating step of pressing said spacing fibers against said fiber waveguides to maintain regions of contact therebetween as said spacing fibers and said fiber waveguides are moved through said holder.

* * * * *